United States Patent [19]

Loper, Jr.

[11] 4,258,572

[45] Mar. 31, 1981

[54] SINGLE AXIS CRYSTAL CONSTRAINED TEMPERATURE COMPENSATED DIGITAL ACCELEROMETER

[75] Inventor: Edward J. Loper, Jr., Santa Barbara, Calif.

[73] Assignee: General Motors Corporation, Detroit, Mich.

[21] Appl. No.: 99,869

[22] Filed: Dec. 3, 1979

[51] Int. Cl.³ .............................................. G01P 15/09
[52] U.S. Cl. ........................................ 73/497; 310/329
[58] Field of Search .................. 73/497, 708; 310/315, 310/328, 329, 341, 342, 346

[56] References Cited

U.S. PATENT DOCUMENTS 3,479,536  11/1969  Norris ..................... 73/517 AV X
4,160,183  7/1979  Kusters et al. ................... 310/315

OTHER PUBLICATIONS

"Dual Mode Operation of Temperature and Stress Compensated Crystals" by Kusters et al., Proceedings of the 32nd Annual Symposium on Frequency Control, 1978.

"The Force-Frequency Effect in Doubly Rotated Quartz Resonators" by Bollato et al., Proceedings of the 31st Annual Symposium on Frequency Control, 1977.

Primary Examiner—James J. Gill
Attorney, Agent, or Firm—Albert F. Duke

[57] ABSTRACT

An accelerometer utilizes a pair of SC-cut crystals which respond differentially to acceleration inputs. Each crystal exhibits a highly temperature sensitive resonant mode and a relatively temperature insensitive resonant mode. Both modes are excited simultaneously by an oscillator. The difference frequency data between respective modes of each crystal, as well as the difference frequency data between the two modes of one of the crystals, is processed to obtain a temperature compensated value of acceleration.

3 Claims, 2 Drawing Figures

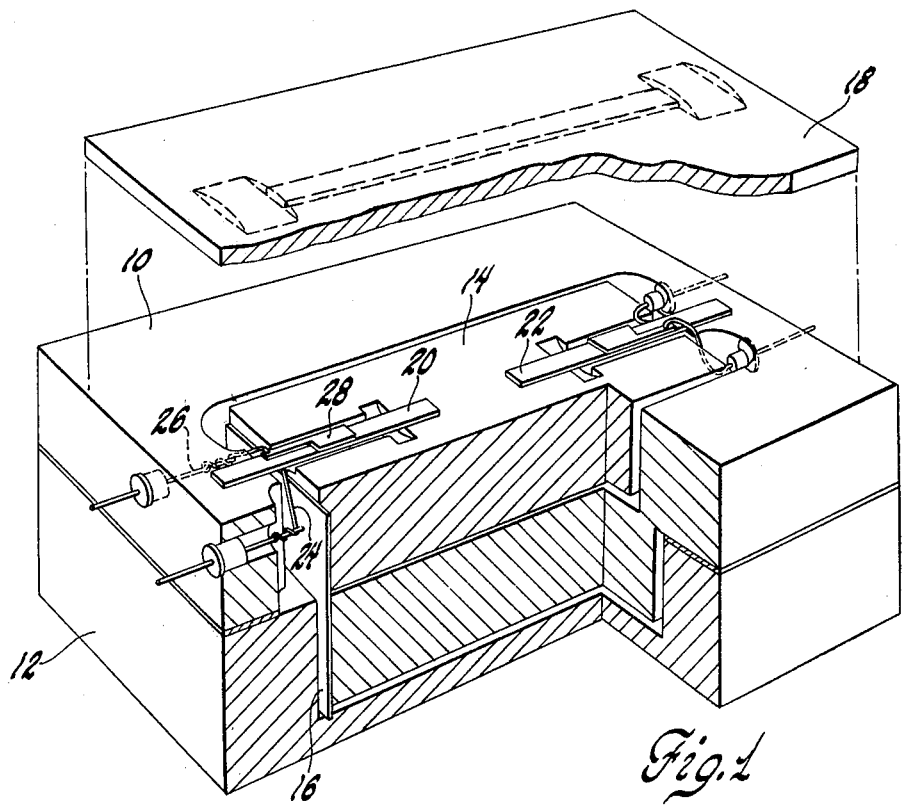
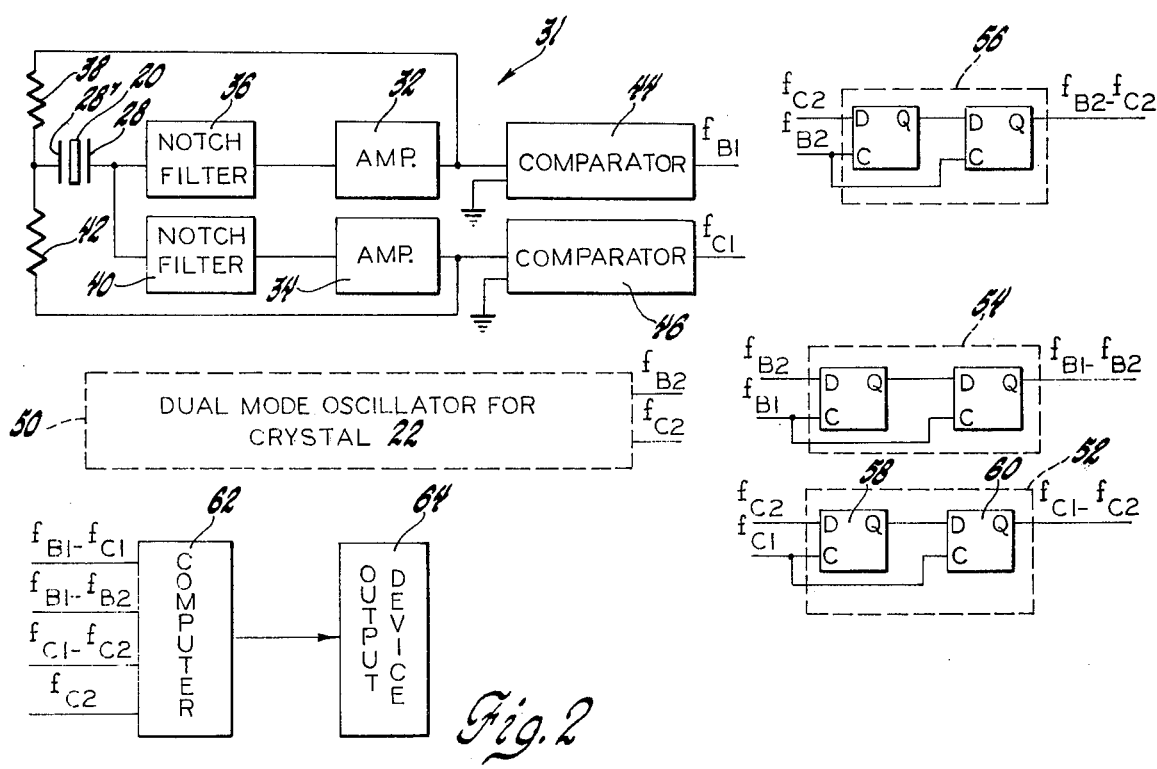

SINGLE AXIS CRYSTAL CONSTRAINED TEMPERATURE COMPENSATED DIGITAL ACCELEROMETER

The invention described herein was made in the course of work under a contract with the Department of Defense.

FIELD OF THE INVENTION

This invention relates to accelerometers and, more particularly, to a crystal constrained temperature compensated accelerometer.

BACKGROUND OF THE INVENTION

Piezoelectric crystals have been used for many years as frequency standards due to their stable resonant properties. Recognition that these crystals are sensitive to mechanical stress lead to the initial concept of a piezoelectric resonant transducer for the measurement of strain produced in the crystal by external forces. The frequency shift caused by mechanical strain is particularly convenient for obtaining measurements of applied force in digital form.

One prior art accelerometer uses two AT-cut thickness shear mode crystals preloaded in compression by a spring supported between halves of a split mass. When an acceleration is applied along its sensitive axis, the compressive strain is increased in one crystal and decreased in the other. This differential compressive strain shifts the resonant frequencies of the two crystals thereby providing a digital measure of the acceleration applied along the sensitive axis. This accelerometer requires a close matching of the thermal sensitivities of the crystals if good performance is to be attained. Also, accurate thermal tracking between the two crystals is necessary because the common mode rejection capabilities of the differential accelerometer will be limited by the temperature mismatch between the two ends. Therefore, the performance potential of two AT-cut crystals differentially measuring acceleration is low due to the residual temperature sensitivity of the resonant section and the design difficulties in attempting to match temperatures at both active resonant sections.

SUMMARY OF THE INVENTION

With the foregoing in mind, it is an object of the present invention to provide an improved temperature compensated digital strain transducer. It is another object of the present invention to provide an accelerometer utilizing a pair of differentially loaded piezoelectric crystals each having two independent resonant modes, each sensitive to acceleration effects but exhibiting substantially different temperature sensitivities and utilizing the frequency information from the two modes for separating the effects of temperatures and strain in order to obtain an accurate temperature compensated measure of acceleration.

In accordance with the present invention an accelerometer is provided which comprises two doubly rotated SC-cut crystals operating differentially on a proof mass. An SC-cut crystal is cut from a block of single crystal quartz with the plane of the sheet having cut angles $\theta$ and $\phi$ of 34.11° and 21.93° with respect to the crystallographic axes of the quartz and has two fundamental thickness shear resonant modes along the principal resonant axes of the sheet. These two modes are commonly referred to as the B mode which is highly temperature sensitive, and the C mode which is relatively temperature insensitive. Both of these resonant modes have significant strain sensitivities, peaking at approximately 45° azimuth angle. The strain sensitivities are also temperature sensitive. Both resonant modes occupy the same volume of quartz and have orthogonal elastic displacements. Further discussion of the SC-cut crystal may be found in "The Force-Frequency Effects in Doubly Rotated Quartz Resonators", A. Ballato et al. 31st Frequency Control Symposium, 1977. Each mode of each of the crystals is excited simultaneously by a dual oscillator circuit. The difference frequency data $\Delta f_C$ between the low temperature sensitive C modes of the two crystals is used as a measure of acceleration. This data is in error due to temperature effects on the C mode frequencies. The difference frequency data $\Delta f_B$ between the high temperature sensitive B modes of the two crystals and the difference frequency $\Delta f_{B-C}$ between the high and low temperature sensitive modes of one of the crystals is used to determine the error in the $\Delta f_C$ data associated with temperature so that the accelerometer data can be corrected for this error. Further accuracy may be obtained by using one of the C mode frequencies in addition to the difference frequency to eliminate errors in frequency measurements resulting from time base deviations.

A more complete understanding of the present invention may be had from the following detailed description which should be read in conjunction with the drawings, in which:

BRIEF DESCRIPTION OF THE DRAWINGS

FIG. 1 is a pictorial representation of the accelerometer of the present invention; and FIG. 2 is a block diagram of the electronic circuitry utilized in the present invention.

DESCRIPTION OF THE PREFERRED EMBODIMENT

Referring now to the drawings and initially to FIG. 1, the accelerometer assembly of the present invention comprises a support member 10 which is bonded to a base plate 12. The member 10 supports a proof mass 14 at each end thereof by a pair of leaf-type springs 16. A cover 18 is bonded during final assembly to the member 10. A pair of doubly rotated SC-cut quartz crystals 20 and 22, have their opposite ends attached respectively to the proof mass 14 and the member 10. The crystals 20 and 22 have a thickness of approximately $5.8 \times 10^{-3}$ inches and a width of approximately $40 \times 10^{-3}$ inches. The springs 16 are preferably formed of a material having thermal expansion properties very close to those of the support member 10 and proof mass 14 along their axes in the plane of the spring 16. The springs 16 permit movement of the mass 14 along the longitudinal axis of the crystals 20 and 22 but prevent movement normal to that axis. In response to an acceleration force the proof mass 14 differentially loads the crystals 20 and 22, causing one to be placed under a tensile strain and the other under a compressive strain. Gold leads 24 and 26 make contact with two gold electrodes 28 and 28', affixed to opposite sides of each of the crystals 20 and 22. The assembly is filled with a partial pressure of an inert gas, such as neon and is hermetically sealed. The assembly shown in FIG. 1 is preferably supported within an outer case by a long time constant material. A vacuum is created within the outer case which is also hermetically sealed.

Referring now to FIG. 2, the crystal 20 is driven simultaneously in both its B and C mode by a dual mode oscillator generally designated 31. The oscillator 31 comprises an amplifier 32 which is connected by lead 26 to the electrode 28 of the crystal 20 through a notch filter 36 which attenuates or rejects the C mode resonant frequency of the crystal 20. The output of the amplifier 32 is fed back through lead 24 and electrode 28' to the crystal 20 through a summing resistor 38. The amplifier 32 drives the crystal 20 at the resonant frequency of the B mode with zero phase shift. Similarly, an amplifier 34 has its input connected to the crystal 20 through a notch filter 40 which rejects the B mode resonant frequency of the crystal 20. The output of amplifier 34 is fed back to the crystal 20 through summing resistor 42. The amplifier 34 drives the crystal 20 at its C mode resonant frequency with zero phase shift. The output of the amplifier 32 is fed to a comparator 44 which operates as a squaring buffer to convert the sine wave input to a square wave output signal designated $F_{B1}$, which is highly sensitive to temperature changes in the active region of the crystal 20. The output of the amplifier 34 is fed to a comparator 46 which produces a square wave output signal $f_{C1}$, which is relatively insensitive to temperature variations in the active region of the crystal 20. A second dual mode oscillator generally designated 50 drives the crystal 22 to produce square wave output signals $f_{B2}$ and $f_{C2}$ which are respectively highly sensitive and relatively insensitive to temperature variation in the active region of the crystal 22.

The performance of the crystals 20 and 22 may be represented by the following equations:

$$f_{Bi} = \overline{f_{Bi}} + \alpha_{Bi} T_i + \beta_{Bi} a_i + \gamma_{Bi} a_i T_i \quad (1)$$

$$f_{Ci} = \overline{f_{Ci}} + \alpha_{Ci} T_i + \beta_{Bi} a_i + \gamma_{Bi} a_i T_i \quad (2)$$

where:
- $f_{Bi}$, $f_{Ci}$ are the B and C mode frequencies resulting from the actual temperature and acceleration on the $i^{th}$ crystal (Hz)
- $\overline{f_{Bi}}$, $\overline{f_{Ci}}$ are the bias B and C mode frequencies obtained at the calibration temperature with zero acceleration level (Hz)
- $\alpha_{Bi}$, $\alpha_{Ci}$ are the B and C mode frequency-temperature coefficients based upon data taken near the calibration temperature (Hz/°F.)
- $T_i$; $a_i$ are the temperature and acceleration applied to the $i^{th}$ crystal (°F.; g's)
- $\beta_{Bi}$; $\beta_{Ci}$ are the B and C mode frequency-acceleration coefficients (Hz/g's)
- $\gamma_{Bi}$; $\gamma_{Ci}$ are the B and C mode frequency-acceleration temperature sensitive coefficients (Hz/g/°F.)

The difference frequencies $\Delta f_C = f_{C1} - f_{C2}$, $\Delta f_B = f_{B1} - f_{B2}$ and $\Delta f_{B-C} = f_{B2} - f_{C2}$ are obtained from difference counters 52, 54 and 56 respectively. Each counter comprises a pair of flip-flops such as those designated 58 and 60. The signals $f_{B1}$, $f_{C1}$, $f_{B2}$ and $f_{C2}$ are in the range of 10–15 MHz, however, they are closely matched such that $\Delta f_C$ and $\Delta f_B$ are both less than 200 KHz and $\Delta f_{B-C}$ is less than 1.5 MHz. The difference frequencies signals $\Delta f_C$, $\Delta f_B$, $\Delta f_{B-C}$ are input to a computer generally designated 62 where acceleration and velocity are computed based on the input frequency data. The computer 62 controls an output device 64 which may be a display and/or other devices.

The difference frequency $\Delta f_C$ between the low temperature sensitive C modes is used to determine the acceleration and resulting velocity applied to the proof mass 14 along its sensitive axis.

$$\Delta f_C = f_{C1} - f_{C2} = \overline{f_{C1}} - \overline{f_{C2}} + \alpha_{C1} T_1 - \alpha_{C2} T_2 + \beta_{C1} a_1 \\ - \beta_{C2} a_2 + \alpha_{C1} a_1 T_1 - \alpha_{C2} a_2 T_2 \quad (3)$$

LET:

$$T_1 = T + \Delta T \text{ and } T_2 = T - \Delta T$$

where T is the average temperature of the two crystals and $\Delta T$ is the relative temperature of each crystal with respect to T

AND LET:

$$a_1 = a + \Delta a \text{ and } a_2 = -a + \Delta a$$

where a is the acceleration force experienced by the two crystals along their mutual sensitive axes and $\Delta a$ is the cross acceleration experienced by the two crystals as a result of misalignment $\Delta \theta$ between the two crystals. $\Delta \theta$ is determined during instrument calibration.

REWRITING (3) YIELDS:

$$\Delta f_C = \overline{f_{C1}} - \overline{f_{C2}} + (\alpha_{C1} - \alpha_{C2}) + (\alpha_{C1} + \alpha_{C2})\Delta T \\ + (\beta_{C1} + \beta_{C2})a + (\beta_{C1} - \beta_{C2})\Delta a + (\gamma_{C1} + \gamma_{C2}) \\ (aT + \Delta a \Delta T) + (\gamma_{C1} - \gamma_{C2})(a\Delta T + \Delta a T) \quad (4)$$

Typical coefficients for the SC-cut crystals at 45° azimuth are as follows:

| Resonator 20 Coefficients | B-Mode | C-Mode |
| --- | --- | --- |
| $\overline{f_1}$ (Hz) | 13,422,000 | 12,015,000 |
| $\alpha_1$ (Hz/°F.) | −234 | −6 |
| $\beta_1$ (Hz/g) | −68 | −55 |
| $\gamma_1$ (Hz/g/°F.) | $-115 \times 10^{-3}$ | $-65 \times 10^{-3}$ |
| Resonator 22 Coefficients | B-Mode | C-Mode |
| $\overline{f_2}$ (Hz) | 13,401,000 | 12,005,000 |
| $\alpha_2$ (Hz/°F.) | −236 | −12 |
| $\beta_2$ (Hz/g) | −72 | −57 |
| $\gamma_2$ (Hz/g/°F.) | $-125 \times 10^{-3}$ | $-70 \times 10^{-3}$ |

Substituting the numerical values identified above for the C mode as typical yields:

$$\Delta f_C = 10,000 - 6T - 18\Delta T - 112a + 2\Delta a - 135 \times 10^{-3} \\ (aT + \Delta a \Delta T) + 5 \times 10^{-3}(a\Delta T + \Delta a T) \quad (5)$$

Solving equation (5) for a yields:

$$a = \frac{10,000 - \Delta f_C + 6T(1 + .833 \times 10^{-3} \Delta a)}{112(1 + 1.21 \times 10^{-3}T - .446 \times 10^{-4}\Delta T)} \\ \frac{- 18 \Delta T(1 + 7.5 \times 10^{-3} \Delta a) + 2\Delta a}{} \quad (6)$$

The relative temperature $\Delta T$ in equation (6) may be determined from the B mode difference frequency $\Delta f_B$:

$$\Delta f_B = \overline{f_{B1}} - \overline{f_{B2}} + (\alpha_{B1} - \alpha_{B2})T + (\alpha_{B1} + \alpha_{B2})\Delta T \\ + (\beta_{B1} + \beta_{B2})a + (\beta_{B1} - \beta_{B2})\Delta a + (\gamma_{B1} + \gamma_{B2}) \\ (aT + \Delta a \Delta T) + (\gamma_{B1} - \gamma_{B2})(a\Delta T + \Delta a T) \quad (7)$$

Substituting the numerical values identified above as typical for the B mode yields:

$$\Delta f_B = 21,000 + 2T - 470\Delta T - 140a + 4 - \\ \Delta a - 240 \times 10^{-3} \\ (aT + \Delta a \Delta T) + 10 \times 10^{-3}(a\Delta T + \Delta a T) \quad (8)$$

The sensitivity of $\Delta f_B$ to acceleration may be reduced by subtracting the $\Delta f_C$ equation (5) from the $\Delta f_B$ equation (8) resulting in:

$$\Delta f_B - \Delta f_C = 11{,}000 - 4T - 452\Delta T - 28a + 2\Delta a - 105 \times 10^{-3}$$
$$(aT + \Delta a\Delta T) + 5 \times 10^{-3}(a\Delta T + \Delta aT) \quad (9)$$

Solving for $\Delta T$ yields:

$$\Delta T = \frac{11{,}000 + (\Delta f_C - \Delta f_B) - 4T - 28a + 2\Delta a - 105 \times 10^{-3}aT + 5 \times 10^{-3}\Delta aT}{452(1 - 1.11 \times 10^{-5}a + 2.32 \times 10^{-4}\Delta a)} \quad (10)$$

To determine the average temperature T the difference frequency between the B and C mode is used. Assuming $f_{B2}$ and $f_{C2}$ are used for this computation:

$$f_{B2} - f_{C2} = 1{,}396{,}000 - 224(T + \Delta T) - 12(a + \Delta a) - 55 \times 10^{-3}(a + \Delta a)(T + \Delta T) \quad (11)$$

Equation (11) could be used to directly compute T, however, reduced sensitivity to error sources can be obtained if equation (9) is multiplied by 224/452 and then subtracted from equation (11) yielding:

$$f_{B2} - f_{C2} - (224/452)(\Delta f_B - \Delta f_C) = f(T)$$
$$= 1{,}390{,}549 - 222.018T + 1.8761a$$
$$- 12.9912\Delta a - 2.9646 \times 10^{-3}(aT + \Delta a\Delta T)$$
$$- 57.4779 \times 10^{-3}(a\Delta T + \Delta aT) \quad (12)$$

Solving equation (12) for T:

$$T = \frac{1{,}390{,}549 + 1.8761a - 12.9912\Delta a - 2.9646 \times 10^{-3}\Delta a\Delta T - 57.4779 \times 10^{-3}a\Delta T - f(T)}{222.018(1 + 1.34 \times 10^{-5}a + 2.59 \times 10^{-4}\Delta a)} \quad (13)$$

The computer 62 is programmed to solve equations (6), (10) and (13) iteratively to obtain a measurement of acceleration compensated for temperature effects. The approach proposed by the subject invention to obtain an accurate measure of acceleration may be summarized as follows:

1. Use the difference frequency data ($\Delta f_C$) between the low temperature sensitive C modes of both crystals to establish the acceleration level a and resulting velocity change, correcting the $\Delta f_C$ data for average and relative temperature effects as well as cross coupling acceleration effects.
2. Use the difference frequency data ($\Delta f_B$) between the high temperature sensitive B modes along with the data from step #1 to obtain an accurate measure of the relative temperature between the two active areas of the crystals, correcting the $\Delta f_B - \Delta f_C$ data as required for average temperature and acceleration.
3. Use the difference frequency data between the high and low temperature sensitive modes of a single crystal along with the data obtained in steps #1 ($\Delta f_C$) and #2 ($\Delta f_B$) to determine the average temperature of the active areas of the two crystals, correcting the fT data as required for relative temperature and acceleration.

The computation of a, T and $\Delta T$ as set out above is dependent on the accuracy of the time base in the computer 62. That is to say, the measurement of the frequency of the input signals will be in error if the computer clock frequency varies. This time base error may be of significance in the computation of average temperature T which has the most significant effect on the accuracy of the computation of acceleration. The need for an accurate absolute time base in the computation of average temperature may be eliminated by computing T on the basis of B and C mode data collected over the same time interval. In order to determine $f_{B1} + f_{B2}$ and $f_{C1} + f_{C2}$, the signal $f_{C2}$ is also interrogated by the computer 62.

$$f_{B1} + f_{B2} = (f_{B1} - f_{B2}) + 2(f_{B2} - f_{C2}) + 2f_{C2} \quad (14)$$

Similarly:

$$f_{C1} + f_{C2} = 2f_{C2} + (f_{C1} - f_{C2}) \quad (15)$$

From equation (1):

$$f_{B1} + f_{B2} = \overline{f_{B1}} + \overline{f_{B2}} + \alpha_{B1}T_1 + \alpha_{B2}T_2 + \beta_{B1}a_1$$
$$\beta_{B2}a_2 + \gamma_{B1}a_1T_1 + \gamma_{B2}a_2T_2 \quad (16)$$

From equation (2):

$$f_{C1} + f_{C2} = \overline{f_{C1}} + \overline{f_{C2}} + \alpha_{C1}T_1 + \alpha_{C2}T_2 + \beta_{C1}a_1$$
$$+ \beta_{C2}a_2 + \gamma_{C1}a_1T_1 + \gamma_{C2}a_2T_2 \quad (17)$$

Substituting for $T_1$, $T_2$, a and $a_2$ as before and letting $\overline{f_{C1}} + \overline{f_{C2}} = \overline{F_C}$ and $\overline{f_{B1}} + \overline{f_{B2}} = \overline{F_B}$ $$f_{B1} + f_{B2} = \overline{F_B} + (\alpha_{B1} + \alpha_{B2})T + (\alpha_{B1} - \alpha_{B2})\Delta T$$
$$+ (\beta_{B1} - \beta_{B2})a + (\gamma_{B1} - \gamma_{B2})aT$$
$$+ (\gamma_{B1} + \gamma_{B2})a\Delta T + (\beta_{B1} + \beta_{B2})\Delta a$$
$$+ (\gamma_{B1} + \gamma_{B2})\Delta aT + (\gamma_{B1} - \gamma_{B2})\Delta a\Delta T \quad (18)$$

and $$f_{C1} + f_{C2} = \overline{F_C} + (\alpha_{C1} + \alpha_{C2})T + (\alpha_{C1} - \alpha_{C2})\Delta T$$
$$+ (\beta_{C1} - \beta_{C2})a + (\gamma_{C1} - \gamma_{C2})aT$$
$$+ (\gamma_{C1} + \gamma_{C2})a\Delta T + (\beta_{C1} + \beta_{C2})\Delta a$$
$$(\gamma_{C1} + \gamma_{C2})\Delta aT(\gamma_{C1} - \gamma_{C2})\Delta a\Delta T \quad (19)$$

Let:

$$\frac{f_{B1} + f_{B2}}{f_{C1} + f_{C2}} = \frac{F_B \text{ data}}{F_C \text{ data}} \text{ (accumulated over the same time interval)} = R_{B/C}$$

Therefore:

$$(\alpha_{B1} + \alpha_{B2})T + (\gamma_{B1} - \gamma_{B2})aT + (\gamma_{B1} + \gamma_{B2})\Delta aT$$
$$- R_{B/C}(\alpha_{C1} + \alpha_{C2}) - R_{B/C}(\gamma_{C1} - \gamma_{C2})aT - R_{B/C}(\gamma_{C1} + \gamma_{C2})\Delta aT$$

$$=$$

$$-\overline{F_B} - (\alpha_{B1} - \alpha_{B2})\Delta T - (\beta_{B1} - \beta_{B2})a - (\gamma_{B1} + \gamma_{B2})a\Delta T$$
$$- (\beta_{B1} + \beta_{B2})\Delta a - (\gamma_{B1} - \gamma_{B2})\Delta a\Delta T + R_{B/C}[\overline{F_C}$$
$$+ (\alpha_{C1} - \alpha_{C2})$$
$$\Delta T + (\beta_{C1} - \beta_{C2})a + (\gamma_{C1} + \gamma_{C2})a\Delta T + (\beta_{C1} + \beta_{C2})\Delta a$$
$$+ (\gamma_{C1} - \gamma_{C2})\Delta a\Delta T] \quad (20)$$

Substituting the numerical values of the calibration coefficient identified above and solving for T:

$$T = \frac{\begin{array}{l}24.02 \times 10^6 R_{B/C} - 26.823 \times 10^6 + (6 R_{B/C} - 2)\Delta T \\ + (2 R_{B/C} - 4)a + (112 R_{B/C} + 140)\Delta a \\ + (240 \times 10^{-3} - 135 R_{B/C})a\Delta T + (240 \times 10^{-3} + \\ 5 \times 10^{-3} R_{B/C})\Delta a\Delta T\end{array}}{\begin{array}{l}470 + 18 R_{B/C} + (10 \times 10^{-3} + 5 \times 10^{-3} R_{B/C})a \\ + 135 R_{B/C} - 240 \times 10^{-3}) a\end{array}} \quad (21)$$

The computer 62 may be programmed to solve either equation (13) or (21) to determine T, however, greater accuracy can be achieved with equation (21). $R_{B/C}$ is, for example, computed each second which is a desirable update interval for T. $\Delta a$, $\Delta T$ and a are computed more frequently, for example, every 20 millisecond.

The embodiments of the invention in which an exclusive property or privilege is claimed are defined as follows:

1. A temperature compensated accelerometer comprising first and second piezoelectric crystals, each crystal capable of being simultaneously excited in a first resonant mode which is highly temperature sensitive and a second resonant mode which is relatively temperature insensitive, each resonant mode being sensitive to acceleration, means for exciting each of said first and second crystals in both of their resonant modes simultaneously, means for differentially loading said crystals in response to acceleration whereby one crystal senses tensile strain and the other senses compressive strain, means producing output signals $\Delta f_B$ and $\Delta f_C$ of a frequency corresponding respectively to the difference between the respective first resonant modes of the two crystals and the respective second resonant modes of the two crystals and producing an output signal $\Delta f_{B-C}$ of a frequency corresponding to the difference between the first and second resonant modes of one of said crystals, means responsive to said output signals for separating the effects of temperature and acceleration on the frequency of the $\Delta f_C$ output signal to obtain a temperature compensated value of acceleration.

2. A temperature compensated accelerometer comprising first and second piezoelectric crystals, each crystal capable of being simultaneously excited in a first resonant mode which is highly temperature sensitive and a second resonant mode which is relatively temperature insensitive, each resonant mode being sensitive to acceleration, means for exciting each of said first and second crystals in both of their resonant modes simultaneously, means for differentially loading said crystals in response to acceleration whereby one crystal senses tensile strain and the other senses compressive strain, means producing output signals $\Delta f_B$ and $\Delta f_C$ of a frequency corresponding respectively to the difference between the respective first resonant modes of the two crystals and the respective second resonant modes of the two crystals and producing an output signal $\Delta f_{B-C}$ of a frequency corresponding to the difference between the first and second modes of one of said crystals, means responsive to said output signals and to one of the resonant mode output frequencies of one of said crystals for separating the effects of temperature and acceleration on the frequency of the $\Delta f_C$ output signal to obtain a temperature compensated value of acceleration.

3. A temperature compensated accelerometer comprising first and second piezoelectric crystals, each crystal capable of being simultaneously excited in a first resonant mode which is highly temperature sensitive and a second resonant mode which is relatively temperature insensitive, each resonant mode being sensitive to acceleration, means for exciting each of said first and second crystals in both of their resonant modes simultaneously, means for differentially loading said crystals in response to acceleration whereby one crystal senses tensile strain and the other senses compressive strain, means producing output signals $\Delta f_B$ and $\Delta f_C$ of a frequency corresponding respectively to the difference between the respective first resonant modes of the two crystals and the respective second resonant modes of the two crystals and producing an output signal $\Delta f_{B-C}$ of a frequency corresponding to the difference between the first and second resonant modes of one of said crystals, computer means responsive to said output signals for determining acceleration corrected for average and relative temperature effects on the crystals.

* * * * *